INVENTOR.
ANGELO R. DE VITO
ATTORNEYS.

Patented Apr. 6, 1954

2,674,483

UNITED STATES PATENT OFFICE 2,674,483

DOOR CONTROL MECHANISM

Angelo R. de Vito, Cleveland Heights, Ohio, assignor, by mesne assignments, to Rudolph I. Schonitzer, Cleveland, Ohio Application October 21, 1949, Serial No. 122,775

3 Claims. (Cl. 292—229)

This invention relates to closure control mechanisms; viz., apparatus for effecting and controlling the latching or latching and locking of closures of the nature of doors, especially doors of the type used in automotive vehicles.

More particularly, the invention relates to a door control mechanism of a kind which may be broadly described as having co-acting elements associated with the door structure and door frame structure whereby the door may be latched and held in closed position or unlatched and released from closed position, such mechanism including means whereby one of the coacting elements is retained in operative or door-latched position when the door is closed and, when the mechanism is actuated to permit opening, is moved toward operated or door-unlatched position concurrently with opening of the door. In addition to having these features, it is desirable that the door control mechanism not only be extremely sturdy and foolproof but include means for holding the door securely closed under the most severe operating conditions.

Accordingly, among the objects of the present invention is the provision in a door control mechanism of latching means which are compact, rugged, easy of access, susceptible of economical manufacture and ready installation, and which occupy a minimum of space, effectively protecting the moving parts from ice, dirt, sprayed paint, etc., and obviating undesired engagement with structural or operating elements such as the glass run channel which might interfere with the proper functioning of the door control mechanism as a whole.

Other objects and advantages of the present invention will appear from the following description and the accompanying drawings, in which:

Figures 8 and 9 are elevations similar to those of Figures 3 to 6 illustrating the action when an attempt is made to close door E with latch arm member L in the position which it assumes when fully latched.

Figure 1:
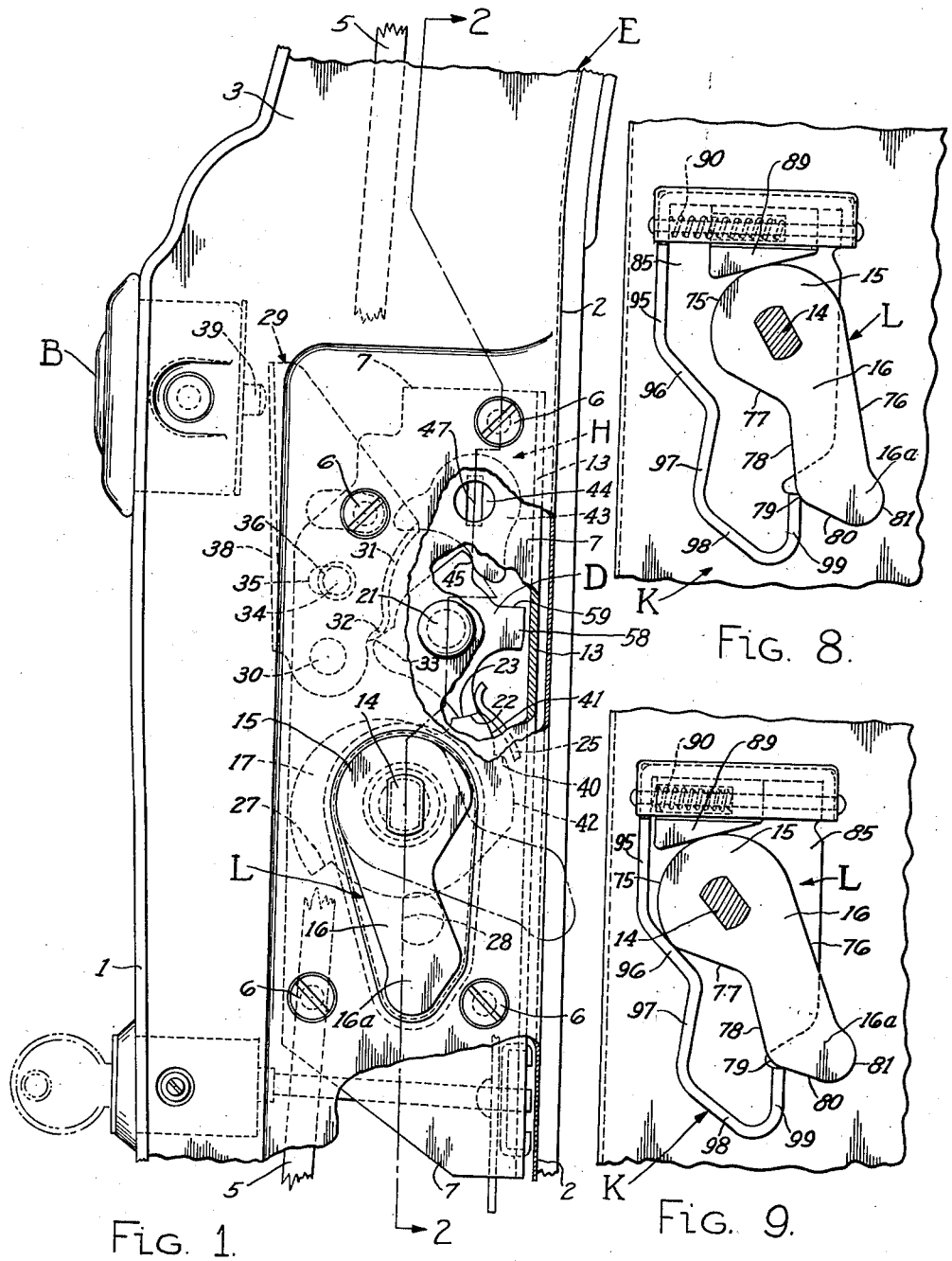
Figure 1 is an elevation, with parts broken away, of the free edge of the left-hand front door of an automobile in which door is incorporated a latch mechanism forming part of the present invention.
Figure 2:
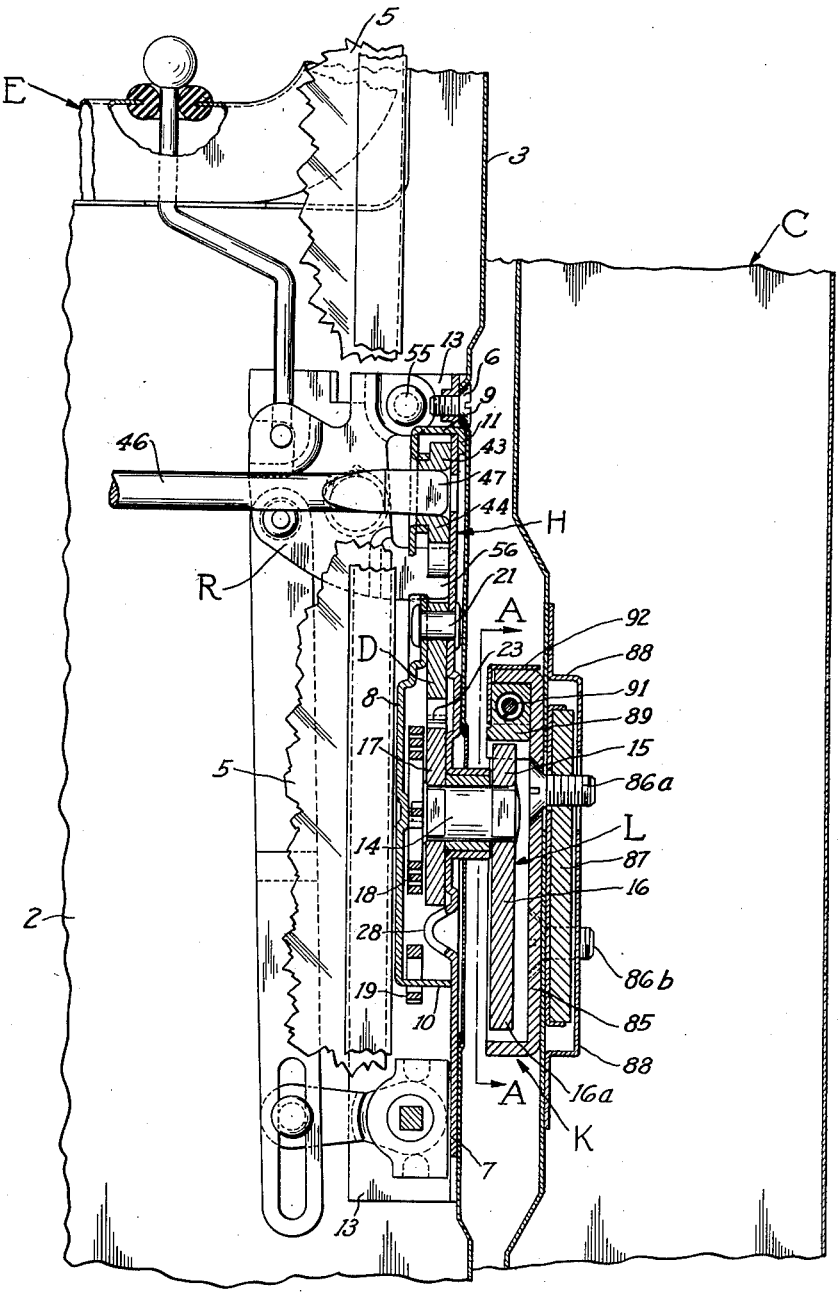
Figure 2 is a section, with parts in elevation, along line 2—2 of Figure 1, the automobile door E appearing to the left and a cooperating body pillar C appearing to the right of what may be called the cleavage plane.

In Figures 1 and 2 I have illustrated one embodiment of the improved door control mechanism of the present invention, the same being shown as installed in the left-hand front door of an automobile. Door E is hinged at its forward edge (not shown) and is adapted to close against body pillar C of the automobile. It has the usual outer panel 1 and inner panel 2 and its free edge wall 3 closes the rear edge of the door structure. Suitable means, not shown, are provided for raising and lowering the window glass 5, which is supported and guided in the usual glass run channels. Located in the door structure and concealed behind edge wall 3 is latch housing H.

As is seen in Figures 1 and 2, latch housing H of the door control mechanism includes a base plate 7 forming one side wall of the housing and adapted to be held against the inner surface of the door edge wall 3 by the screws 6 engaging threaded holes in base plate 7. It also includes a cover plate 8 extending generally parallel to and spaced from base plate 7. Integrally formed end walls 9 and 10 extend from the cover plate 8 and are secured to base plate 7 by bent over tangs or lugs, one of which, designated 11, appears in Figure 2. One edge of the housing H is substantially closed by the edge or side wall 13, which may conveniently be formed integrally with the base plate 7 and which, as will appear more fully later, projects somewhat beyond cover plate 8 and supports the latch restraining or locking means and the actuating members therefor.

Extending through and having suitable bearing in the base plate 7 is the latch shaft 14 (see Figures 1 and 2). A plate-like latch member L is secured to the outer end of shaft 14, and in the illustrated form of the invention, comprises a body portion 15, a shank portion 16, and a foot portion 16a forming part of shank portion 16. Mounted on the inner end of shaft 14 within the housing H is the latch control element 17, it being understood that both latch arm member L and latch control element 17 are secured to and pivotally supported by shaft 14 for concurrent limited oscillatory movement. A spiral spring 18 is disposed adjacent the inner face of the latch control element 17 and has its inner end operatively connected to the control element 17. The outer fixed end 19 (Figure 2) of spring 18 extends downwardly through an aperture in the bottom end wall 10 and is bent to retain it in proper operating position. As spring 18 is installed in pre-loaded condition, it tends at all times to rotate shaft 14, latch control element 17 and latch member L in unlatching or door-opening direction (counterclockwise as seen in Figure 1 but clockwise as seen in Figures 3 to 9, inclusive).

In order releasably to maintain latch member L in position to hold the door closed, a detent D is pivotally supported above control element 17 on a pin 21 which is secured as by riveting to housing H. Control element 17 and detent D are provided with cooperating shoulder or abutment portions 22 and 23 (see Figure 1) which are preferably formed on a radius from the center of the pin 21 in order to facilitate release of the control element from door-latched position. Urging detent D into a position tending to hold control element 17 in operative or latched position is a leaf spring 25, seen in Figure 1, which spring is supported at its lower end (not shown) by bottom end wall 10 and has its upper end pressing as illustrated against the side of abutment 23 of detent D.

From the above description it will be seen that detent D is constantly urged in clockwise direction (as seen in Figure 1) by leaf spring 25 while latch control element 17 is constantly urged in counterclockwise direction by spiral spring 18. With door E open and the parts in operated or unlatched position, if door E is moved toward the closed position, illustrated in Figure 1, the foot portion 16a of shank portion 16 of latch member L strikes the keeper hereinafter described, causing latch member L, shaft 14 and latch control element 17 to rotate in clockwise direction as seen in Figure 1. During this movement, spiral spring 18 is being wound up or tensioned and when the door reaches fully closed position, latch control element 17 has been rotated sufficiently in clockwise direction to permit abutment 23 of detent D to slide over the face of the abutment 22 of latch control element 17 into the operative or latched position shown in Figure 1. This engagement of the abutments 22 and 23 effectively prevents undesired release of the latch member L from latched position. The degree of rotation of latch member L when it moves from operative into operated position is limited by engagement of stop 27 on latch control element 17 with boss 28 on base plate 7.

In order to operate detent D to effect release and permit movement of latch control element 17, together with the latch member L, from operative or latched position into operated or unlatched position, a detent control member is provided in the form of a control arm generally indicated at 29 (Figure 1) and pivotally mounted at its lower end on a pin 30 carried by the housing H. The inner edge 31 of control arm 29 is bent over to form a detent engaging face 32 which operatively engages a cam face 33 on detent D. Movement of control arm 29 about pin 30 is limited by a pin 34 which is supported by base plate 7, extends through a slot 35 in control arm 29, and has a head portion 36 which assists in guiding and supporting control arm 29.

In Figure 1, control arm 29 is in its non-operating or retracted position with pin 34 engaging the right-hand end of slot 35. As detent D is urged in clockwise direction by leaf spring 25, control arm 29 is urged in counterclockwise direction due to engagement of detent engaging face 32 with cam face 33 on detent D. Movement of both detent D and control arm 29 under the influence of leaf spring 25 is limited, however, by pin 34, which is so positioned relative to slot 35 that a positive stop is provided precluding further counterclockwise movement of control arm 29 when the abutment 23 on detent D is in the latch-holding position shown in Figure 1.

An outer flange 38 is formed on control arm 29 and is adapted to be engaged by the operating plunger 39 of an outside latch operating unit B. When the parts of the mechanism are in the operative or latched position shown in Figure 1 and inward pressure is exerted on the upper end of the control arm 29, the resulting inward movement of control arm 29 causes detent-engaging face 32 thereof to act upon cam face 33 of the detent D to rotate the detent in counterclockwise direction against the pressure of leaf spring 25. This movement causes detent abutment 23 to move away from control element abutment 22, releasing the latch control element 17 for movement in counterclockwise (Figure 1) direction, concurrently with opening of the door, until stop 27 on element 17 strikes boss 28 on the base plate 7. This movement of latch control element 17 occurs simultaneously with corresponding movement of latch member L from its operative or latched position, shown in solid lines in Figure 1, into operated or unlatched position, shown in phantom lines.

In some instances it is desirable to provide two different positions in which the latch member L is held against movement in unlatching direction by detent D. One of these positions, in which door E is fully closed, may be termed the operative or latched position and is illustrated in Figure 1. The other, in which the door is not fully closed, may be termed the secondary latched position. Both, but particularly the latter, are to be differentiated from what will hereinafter be referred to as quasi-latched position in which, with door E open, latch arm member L is made to assume the position which it assumes in said latched position.

To provide the desired secondary latching action, a secondary abutment 40 (seen in Figure 1) is incorporated in latch control element 17 which secondary abutment is circumferentially spaced from main abutment 22. A cam surface 41 extends between secondary abutment 40 and main abutment 22 and another cam surface 42 extends in the opposite direction away from secondary abutment 40.

When door E is open and the parts are in operated or unlatched position, the lower corner of detent abutment 23 rests upon cam surface 42, being held thereagainst by leaf spring 25. With the parts in this relation, when door E is moved toward closed position, engagement of shoe portion 16a of shank portion 16 of latch member L with the keeper hereinafter described causes latch member L and control element 17 to move in clockwise (Figure 1) direction, with the result that the lower corner of detent abutment 23 slides along cam face 42 until it reaches secondary abutment 40, when it moves down into engagement therewith. Thus, if door E is not closed with sufficient force for full closing it will be held in its secondary latched position. As the door continues to move in closing direction beyond the secondary latched position and the latch control element 17 continues to rotate in clockwise direction, the lower corner of detent abutment 23 will be cammed outwardly by cam surface 41 until it reaches the corner of main abutment 22, whereupon it is snapped into full latched position.

It will be understood that in normal operation of door E the mechanism moves without hesitation through the secondary latched position and that if the secondary latch arrangement is not desired it is only necessary to omit secondary abutment 40 and continue cam surface 42 to the corner or outer edge of main abutment 22.

The portions of the door control mechanism described up to this point provide means operable from the outer side of door E for latching and unlatching the door. It is usually desirable to provide means for operating the latch mechanism from the inner side of the door and to accomplish this there is provided, in addition to control arm 29, another detent control member herein illustrated in the form of a pawl 43 (see Figure 1) which is provided with a hub portion 44 pivotally supported in cover plate 8. Pawl 43 is positioned to engage a cam face 45 on detent D.

To move detent D in latch-releasing direction from its latch-restraining position as seen in Figure 1, it is only necessary to rotate pawl 43 in clockwise direction, thus causing corresponding counterclockwise rotation of detent D until detent abutment 23 is moved out of engagement with main abutment 22. This movement of pawl 43 may be accomplished entirely independently of control arm 29 and thus provides a second control means for the release of the latch arm member L from its operative or latched position. As the inside latch operating unit is usually located away from the edge 3 of door E, an operating member is provided such as a shaft 46 (see Figure 2) having a flattened end portion 47 operatively engaged in hub 44 of pawl 43. It will be apparent that pawl 43 may be actuated by rotating shaft 46 in the appropriate direction by any suitable means.

In order to prevent opening of door E by unauthorized operation of the door control mechanism, means are provided for restraining movement of latch arm member L from its door-closed ("operative") position into its door-released ("operated") position. As illustrated in Figure 2, such means include a detent-blocking or restraining member R which is pivotally supported on a pin 55 carried by edge wall 13 of housing H. Member R lies generally parallel to and adjacent edge wall 13 and has a lower detent-engaging end 56 which is adapted to be moved into and out of restraining position upon movement of member R about pin 55. Movement of restraining member R into latch-restraining position is limited by engagement of end portion 56 with the inner surface of base plate 7. In order to permit end portion 56 of member R to move into and out of latch-restraining position, cover plate 8 of housing H is cut away as necessary near edge wall 13.

Detent D is formed with a projecting arm 58 having a stop face 59 which is adapted to be engaged by the lower edge of end portion 56 of restraining member R. From Figure 2, which illustrates the door control mechanism in latch-restraining position, it will be noted that when in this position restraining member R has been swung counterclockwise about pin 55 until the outer edge of end portion 56 has engaged the inner face of the base plate 7. In this position, the lower edge of end portion 56 is disposed directly above and in blocking relation to stop face 59 of arm 58 on detent D. Thus rotation of the detent in counterclockwise direction as seen in Figure 1 is effectively prevented.

Suitable means for actuating the locking or restraining member R from either inside or outside of the door are shown in the drawings but need not be described in detail herein as they form no part of the present invention and, along with the other features so far described, except latch member L and its keeper, are found in substantially the same relationship to each other in the latch mechanism shown, described and claimed in the co-pending application of Edwin L. Allen bearing Serial No. 746,521, filed May 7, 1947, for Door Control Mechanism. Cross reference is hereby made thereto as said Allen application is owned by the assignee of the present application.

Latch member L, being made of a single plate-like element characterized, among other things, by a body portion 15, a shank portion 16 and a foot portion 16a, differs significantly from the bifurcated latch member of said prior application. The keeper K cooperating therewith as hereinafter described likewise differs significantly from the keeper of said Allen application.

As indicated in Figures 3 to 6, body portion 15 of latch arm member L has toward the top thereof a more or less semi-circular edge portion 75 which at one end is continued substantially tangentially so as to become the long straight edge 76 defining the outer side edge of shank portion 16 and at its other end is joined by means of a sharply angled merging edge 77 to a short straight edge 78 defining the inner side edge of shank portion 16. The two side edges 76 and 78 are illustrated as being substantially parallel but it will be understood that this relationship may be varied to a certain extent. Such edges 76 and 78 are connected at the lower (remote from shaft 14) ends thereof by a series of three edges bounding foot portion 16a; viz, a rounded edge 79, a flat edge 80 and a rounded edge 81 which respectively constitute the heel, sole and toe of foot portion 16a.

Keeper K, which in general conforms closely to the shape of latch arm member L, is mounted on body pillar C on the opposite side of the cleavage plane from the latch mechanism in housing H. It includes a plate-like bracket 85 which is affixed, as by screws 86a and 86b, to a clamp plate 87 located in a retaining bracket 88 mounted within and concealed from view by the edge wall of body pillar C. Toward the top of plate-like bracket 85 the latter carries a wedge block assembly consisting of a slideable wedge block 89, a compression spring 90 biasing wedge block 89 toward the position shown in Figures 3 and 4, a pin 91 and a cover 92, all held in place on plate-like bracket 85 in such manner as to permit movement of wedge block 89 on pin 91 to the left from the position seen in Figures 3 and 4. Such movement results when semicircular edge 75 of body portion 15 of latch member L comes into contact with wedge block 89 during closing of the door.

The wedge block assembly is mounted by means of pin 91 on a shallow peripheral wall of the nature of a flange which is integral with plate-like bracket 85 but projects transversely to the plane of the bracket and of the cleavage plane between the door frame structure and door E. Such peripheral wall extends throughout the greater part, but less than all, of the periphery of the bracket, excluding its substantially vertical (Figures 2 to 6) outer edge. Starting at the upper right-hand corner of plate portion 85 of keeper K, as seen in Figures 3 to 6 and proceeding counterclockwise, the peripheral wall or flange consists of an upper section; i. e., a short vertical portion 93, horizontal portion 94, and a long vertical portion 95, the upper section so made up including the parts on which the wedge-block assembly is mounted; an intermediate section made up of an inclined portion 96 and a substantially, but not precisely, vertical portion 97, the latter constituting a cam surface and the former a continuation of it more of the nature of an abutment; and a lower shoe-like section made up of an inclined portion 98 and a short vertical portion 99, the last-mentioned portions forming a pocket at the lower end of the bracket for the foot portion 16a of latch arm member L. It will be understood that the terms horizontal, vertical, etc., used herein are used for descriptive purposes only and relate to the particular installation shown in the drawings. Different settings of the keeper and latch mechanism may be required in different body and door designs.

Across the side of the keeper K facing the cleavage plane; i. e., between vertical portions 93 and 99, the keeper is unobstructed to the end that nothing shall interfere with ingress and egress of latch member L, which cooperates with keeper K in the manner about to be described.

The action as door E is closed against body pillar C is shown in Figures 3 to 6. In these figures, and also in Figures 8 and 9, latch member L, together with shaft 14 on which member L is mounted, appear against a background comprising the edge wall of body pillar C. Among other things, Figures 3 to 6 illustrate the mounting of keeper K in parallelism with the cleavage plane. They also illustrate the manner in which latch member L moves into a position in parallelism with the cleavage plane as door E swings from open to closed position.

Figure 3:
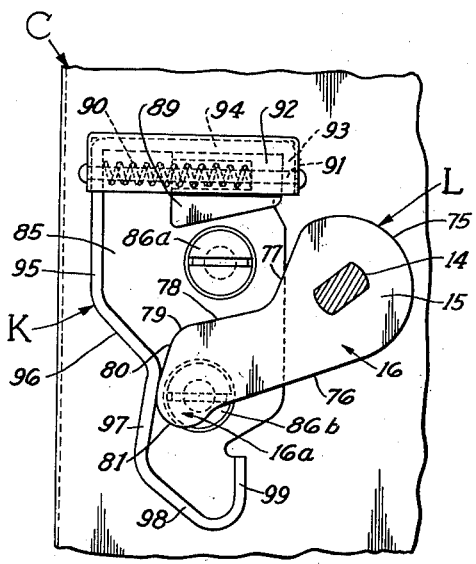
Figures 3, 4, 5 and 6 are elevations, with parts in section, as seen from line A—A of Figure 2, the same showing different positions of latch arm member L and also the cooperating elements on the body pillar C of the automobile.

When door E of the illustrated installation is open and the latch mechanism is in unlatched position the latch member L projects laterally in parallelism to free edge wall 3 thereof in such manner that the shank portion 16 extends at a small angle to the horizontal, this condition being illustrated in Figure 3. As door E moves toward its closed position the foot portion 16a of latch member L comes into contact with the shallow peripheral wall forming part of bracket 85 at the left-hand edge thereof. As seen in Figure 3, the initial contact is made by the flat edge 80 constituting the sole of foot portion 16a which strikes the substantially vertical portion 97 of the intermediate section of the peripheral wall of keeper K. Portion 97 is actually inclined slightly from the vertical, as clearly seen in Figures 3 to 6, to provide the camming action required to swing latch member L in door latching direction (counterclockwise in Figures 3 to 6) as door E moves inwardly toward its closed position.

Pursuant to such camming action, latch member L and shaft 14 are caused to rotate in latching direction with edge 80, which constitutes the sole of foot portion 16a, riding downward along the portion 97 of the peripheral wall on bracket 85. As this action continues, the rounded edge 79 constituting the heel of foot portion 16a comes into contact with the portion 97 of the peripheral wall, causing foot portion 16a of latch member L to enter the shoe-like pocket at the bottom of bracket 85. The same movement brings semi-circular edge 75 on body portion 15 of latch arm member L into a position in which it makes contact with wedge block 89.

Figure 5:
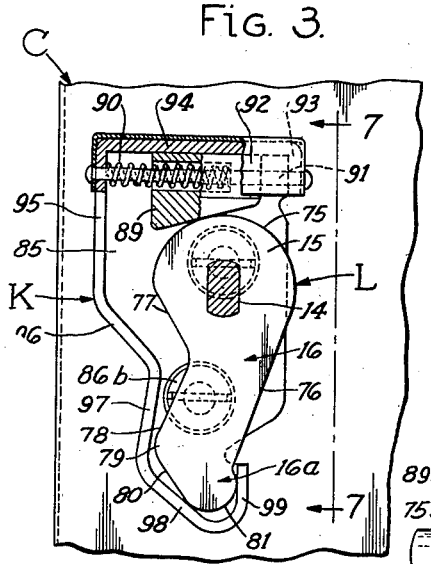

As the door continues to close, wedge block 89 is displaced by latch member L against the action of spring 90, moving into the position shown in Figure 5 in which edge 75 abuts wedge block 89 at the top of bracket 85 and rounded edge 81, comprising the toe of foot portion 16a, abuts portions 98 and 99 of the shoe-like pocket formed in the peripheral wall near the bottom of bracket 85. Thus, in this position which is the latched (operative) position of latch member L, a three point engagement is provided between the latch member and its keeper which is most effective in movement of the latched door E relative to pillar C.

Figure 7:
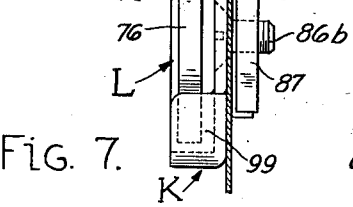
Figure 7 is an end elevation from line 7—7 of Figure 5.

The position of latch member L shown in Figure 5 corresponds to its position in Figures 1, 2 and 7, all of which show the parts in latched and locked positions. Latch member L being in this position, if it is desired to open door E, it is necessary first to rotate the locking or restraining member R in a clockwise direction as seen in Figure 2 to move it into unlocked position. This having been done, detent D, shown in Figure 1, is rotated in latch releasing direction (counterclockwise as seen in Figure 1) by one of the means previously described. This disengages detent abutment 23 from abutment 22 on latch control element 17, allowing the latter to rotate in unlatching direction.

Concurrently, latch member L moves in unlatching direction (counterclockwise from the position shown in Figure 5). In general, the unlatching action is the reverse of the latching action already described; that is to say, rounded edge 81 constituting the toe of foot portion 16a rides upward along portion 98 of the keeper wall until rounded edge 79 constituting the heel of foot portion 16a makes contact with keeper portion 97, after which rounded edge 79 and flat edge 80 move upwardly in contact with portion 97. The latter exercises a camming action displacing latch member L, and therefore door E, in opening direction until it reaches a position, such as that indicated in Figure 3, from which the door may be further opened without restriction as the toe portion of latch member L is now in a position to clear the end of portion 99 of the keeper flange.

Figure 4:
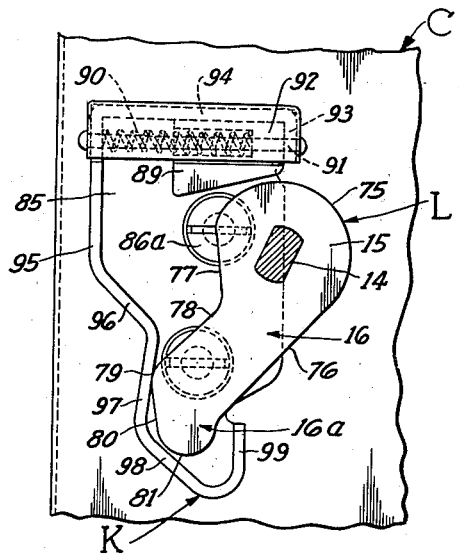

As has already been pointed out, it may be desirable to provide a secondary latched position of the parts entering into the door control mechanism, such position being achieved when abutment 23 on detent D is in contact with secondary abutment 40 on latch control element 17. The position of latch arm member L relative to keeper K when the parts are in their secondary position is shown in Figure 4. In secondary latched position the door cannot be opened except by operation of the inside or outside control means but it is not held firmly against rattling, as will be understood from Figure 4. In this position semi-circular edge 75 of body portion 15 of latch arm member L is out of contact with wedge block 89, so that the stabilizing action of the latter is lacking. At the same time, foot portion 16a of latch arm member L does not have the wedging contact with the peripheral wall outlining bracket 85 shown in Figure 5 and accordingly the free edge 3 of the door E, when in secondary latched position, may have limited in and out and up and down movement relative to the pillar C.

The action described up to this point may be considered as constituting or typifying normal action of the latch mechanism, in addition to which the latter may under certain conditions be subjected to what may be termed an over-riding action as described below.

Assuming that door E has been moving inward in the process of closing against body pillar C and has proceeded past the secondary latched position of Figure 4 into the latched position illustrated in Figure 5, further over-riding movement of latch member L in latching direction is possible because of the clearance provided between the peripheral wall on bracket 85 and edges 77, 78, 79 and 80 of latch arm member L (see Figure 5). Normally, when the door is closed the latch member L comes to rest in the position shown in Figure 5. However, there are conditions in which, because of excessive wear or complete absence of the usual rubber sealing strip, movement of the door beyond its normal desired position of Figures 1 and 5 is possible. Therefore, provision must be made for such over-riding movement of latch member L in latching direction beyond the latched position shown in Figure 5.

Figure 6:
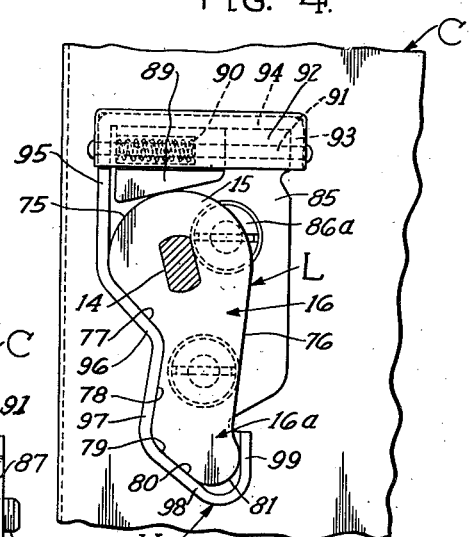

Figure 6 illustrates how this over-riding movement may be had without change in or interference with normal operation of the mechanism. As there represented, wedge block 89 has been forced into its extreme left-hand position. Foot portion 16a has moved into a snug fit with the portions of the shoe-like pocket at the base of the peripheral keeper wall on bracket 85. Above the foot portion, the snug fit is continued by abutment of edge 78 of shank portion 16 against the substantially vertical portion 97 and by abutment of merging edge 77 of body portion 15 with inclined portion 96, all as seen in Figure 6. The permissible over-ride; i. e., the travel of latch member L between the position of Figure 5 and the position of Figure 6, is such that, even under extreme conditions of wear of the door seal strip, the maximum over-ridden position of Figure 6 will rarely if ever be reached in use. It will also be understood that, after any degree of over-riding during closing of the door, latch member L will immediately be returned to normal latched position (Figure 5) by spring 18 and held therein by detent D until released.

Through external manipulation of latch member L (inadvertent or otherwise) when door E is in open position, the latch member may be moved against the action of spring 18 into latched position; that is to say, the position in which shaft portion 16 and foot portion 16a, instead of extending in a generally horizontal direction as indicated in Figure 3, are held in the generally vertical position of Figure 5. This state of affairs, which may be referred to as the quasi-latched position, can give rise to damage to the mechanism if an attempt is made to close door E against body pillar C unless provision is made for absorbing the shock imposed when heel 79 of latch arm member L strikes against vertical portion 99 of the peripheral keeper wall as illustrated in Figure 8.

To cope with this situation, latch member L is so supported that when the foot portion 16a strikes the keeper wall portion 99 the latch member merely rotates on its pivotal support against the increasing resistance of spring 18. If an extreme force is applied to move the door in closing direction when latch member L is in said "quasi-latched" position the parts may reach the limiting position shown in Figure 9. However the arrangement of the parts and the strength of spring 18 is such that when ordinary closing force is used the latch arm member L will be resiliently and safely brought to a stop without any shock or excess load whatever.

Thus the force expended in attempting to close door E when latch arm member L is in quasi-latched position is dissipated, being absorbed largely by the peripheral keeper wall and spring 18 which, when such excess force has been spent, returns latch arm member L to the "quasi-latched" position from which it can be returned to unlatched position by manipulation of push-button B.

This orderly dissipation of the forces transmitted by latch arm member L is possible largely because of the provision of substantial clearance, when latch arm member L is in latched position as seen in Figure 5, between body portion 15 of latch arm member L and the adjacent portions 95, 96 and 97 of the peripheral keeper wall.

The phraseology employed in the specification and the appended claims has been chosen for purposes of description and not for purposes of limitation. It will be understood that, although the illustrated embodiment of the invention has been described in detail, variations and changes may be made without departing from the spirit of the invention. Modifications in the form and arrangement of the parts will be apparent to those skilled in the art, not only in respect of the keeper and the latch member, but also in respect of the type and form of latch mechanism with which my improved latch member and keeper are associated.

It is intended that the patent shall cover, by suitable expression in the appended claims, whatever features of patentable novelty reside in the invention.

I claim:

1. In a door control mechanism for automobile doors or the like; a latch member having a body portion, a shank portion extending from said body portion, and a foot portion at the opposite end of said shank portion from said body portion; means for pivotally supporting said body portion of said latch member for swinging movement of said shank and foot portions between door latched and unlatched positions and in latching direction beyond said door latched position; said foot portion being bounded by a rounded heel edge, a flat sole edge extending obliquely to the longitudinal center line of said shank portion, and a rounded toe edge; a keeper member adapted to be mounted in cooperative relation to said latch member; said keeper member having a bracket base portion and a flange portion extending outwardly therefrom; said flange portion having an abutment section, a cam section and a shoe section; detent means for releasably holding said latch member in door latched position; and means for supporting said latch member and keeper member on a door and its associated door frame whereby, when said latch member is in said door latched position in cooperative engagement with said keeper, said rounded toe edge only of said latch member is in engagement with said shoe section of said keeper, clearance being provided between the other portions of said latch member and said keeper member whereby said latch member may have limited movement in door latching direction beyond said door latched position.

2. In a door control mechanism for automobile doors or the like; a latch member having a body portion, a shank portion extending from said body portion, and a foot portion at the opposite end of said shank portion from said body portion; means for pivotally supporting said body portion of said latch member for swinging movement of said shank and foot portions between door latched and unlatched positions and in latching direction a substantial distance beyond said door latched position; said foot portion being bounded by a rounded heel edge, a sole edge extending obliquely to the longitudinal center line of said shank portion, and a rounded toe edge; a keeper member adapted to be mounted in cooperative relation to said latch member; said keeper member having a base portion and a flange portion extending outwardly therefrom; said flange portion having an abutment section, a cam section and a shoe section; detent means for releasably holding said latch member in door latched position; and means for supporting said latch member and keeper member on a door and its associated door frame whereby, when said latch member is in said door latched position in cooperative engagement with said keeper, said rounded toe edge only of said latch member is in engagement with said shoe section of said keeper, clearance being provided between the other portions of said latch member and said keeper member whereby said latch member may have substantial overriding movement in door latching direction beyond said door latched position.

3. Latch mechanism for use with a door frame structure and a hinged door structure cooperating therewith including, a latch member pivotally mounted on one of said structures for movement between door latched and door unlatched positions, said latch member having a foot portion thereon spaced from the pivotal support thereof and said foot portion having a rounded toe portion at one end remote from said pivotal support, said latch member being substantially flat, a detent member mounted on the same structure as said latch member and adapted releasably to hold said latch member in door latched position, and a keeper mounted on the other of said structures, said keeper including a flange member of greater width than the thickness of said latch member, said flange member including a pocket portion adapted to receive said foot portion, a cam surface positioned to guide said foot portion into said pocket portion as the door is closed, and an abutment portion extending angularly from said cam portion in a direction opposite to and away from said pocket portion, said abutment portion lying in the path of and limiting movement of said latch member in door closing direction, said rounded toe portion only of said foot portion of said latch member being in engagement with said pocket portion of said keeper and said cam portion and abutment portion being spaced from said latch member when the door is closed and said latch member is in said door latched position, said spacing of said cam surface and abutment portion from said latch member providing clearance whereby said latch may have substantial but limited riding movement in door latching direction beyond said door latched position in said keeper.

References Cited in the file of this patent

UNITED STATES PATENTS

| Number | Name | Date |
| --- | --- | --- |
| 1,203,595 | Evensen | Nov. 7, 1916 |
| 1,490,874 | Webb | Apr. 15, 1924 |
| 2,074,191 | Roethel | Mar. 16, 1937 |
| 2,156,874 | Schonitzer | May 2, 1939 |
| 2,311,686 | Olson | Feb. 23, 1943 |
| 2,314,400 | Janonis | Mar. 23, 1943 |
| 2,552,815 | Roethel | May 15, 1951 |
| 2,603,516 | Roethel | July 15, 1952 |